United States Patent [19]

James et al.

[11] Patent Number: 4,490,281

[45] Date of Patent: Dec. 25, 1984

[54] ANTICAKING COMPOSITIONS FOR TREATING HYGROSCOPIC OR WATER-SOLUBLE MATERIAL IN PARTICULATE FORM

[75] Inventors: Alan D. James, Rochdale; Roy Senior, Rossendale, both of England

[73] Assignee: Akzona Incorporated, Enka, N.C.

[21] Appl. No.: 444,657

[22] Filed: Nov. 26, 1982

[30] Foreign Application Priority Data

Dec. 4, 1981 [EP] European Pat. Off. ........ 81201323.3

[51] Int. Cl.$^3$ ............................ C09K 3/00; A23L 1/00
[52] U.S. Cl. .................................... 252/382; 252/383; 252/384; 252/49.5
[58] Field of Search ............... 252/382, 383, 384, 49.5

[56] References Cited

U.S. PATENT DOCUMENTS

| | | | |
|---|---|---|---|
| 3,014,783 | 12/1961 | Young | 252/384 |
| 3,096,171 | 7/1963 | Woerther | 252/384 |
| 3,186,828 | 6/1965 | Baarson et al. | 252/384 |
| 3,234,003 | 12/1966 | Sawyer et al. | 252/383 |
| 3,250,607 | 5/1966 | Sawyer et al. | 252/383 |
| 3,305,491 | 2/1967 | Oster | 252/384 |
| 3,556,718 | 1/1971 | Bachmann et al. | 252/384 |
| 3,740,346 | 6/1973 | Sarrade-Loucheur | 252/383 |
| 4,160,370 | 7/1979 | Hacias | 252/49.5 |
| 4,374,039 | 2/1983 | Schapira et al. | 252/384 |

FOREIGN PATENT DOCUMENTS

| | | |
|---|---|---|
| 2122890 | 5/1971 | Fed. Rep. of Germany . |
| 2221175 | 10/1974 | France . |
| 1574938 | 9/1980 | United Kingdom . |

*Primary Examiner*—Herbert S. Cockeram
*Attorney, Agent, or Firm*—Francis W. Young; Jack H. Hall

[57] ABSTRACT

There is disclosed an anticaking composition comprising a dispersion of an alkyl or cycloalkyl amine, either unneutralized or as a salt, in a liquid medium comprising a water-in-oil emulsion containing from about 5 to about 60 percent, by weight, of water.

There is also disclosed a method of treating hygroscopic or water soluble material in particulate form comprising contacting said material with an anticaking composition which comprises a dispersion of an alkyl or cycloalkylamine in a liquid medium comprising a water-in-oil emulsion containing from about 5 to about 60 percent, by weight, of water, in an amount sufficient to reduce the tendency of said material to agglomerate.

12 Claims, No Drawings

4,490,281

ANTICAKING COMPOSITIONS FOR TREATING HYGROSCOPIC OR WATER-SOLUBLE MATERIAL IN PARTICULATE FORM

BACKGROUND OF INVENTION

This invention relates to anticaking compositions for hygroscopic or water-soluble material in particulate form, such as fertilizers.

Such anticaking compositions are well known in the art as exemplified by the various compositions disclosed in German Pat. Nos. 2,122,890 and 2,721,051, Netherlands Pat. No. 7,307,786 and in Research Disclosure (1980), vol. 189, page 31. Present day compositions of this type are usually based on oil as the liquid medium.

The use of oil-based anticaking compositions has over the past years become progressively less attractive due to the continual increase in the cost of the oil. The obvious solution would seem to be to use aqueous dispersions but such formulations have the disadvantage of introducing too much water into the material which is deleterious in many cases. A need has thus existed for a feasible way to solve such a problem.

SUMMARY OF THE INVENTION

There has now been discovered an anticaking composition comprising a dispersion of an alkyl or cycloalkyl amine, either unneutralized or as a salt, in a liquid medium comprising a water-in-oil emulsion containing from about 5 to about 60 percent, by weight, of water.

There has also been discovered a method of treating hygroscopic or water-soluble material in particulate form comprising contacting said material with an anticaking composition which comprises a dispersion of an alkyl or cycloalkylamine in a liquid medium comprising a water-in-oil emulsion containing from about 5 to about 60 percent, by weight, of water, in an amount sufficient to reduce the tendency of said material to agglomerate.

DETAILED DESCRIPTION OF THE PREFERRED EMBODIMENT

When dealing with mixtures of oil and water one would in practice normally encounter oil-in-water emulsions. However, although such emulsions would certainly reduce the oil cost contribution in the composition they have been found insufficiently effective as an anticaking medium. Surprisingly, by a reversion of phases, that is by the provision of a water-in-oil emulsion, the anticaking compositions based thereon are, in general, equally and in some cases even more effective than the conventional amine/water and amine/oil dispersions.

The water-in-oil emulsions or invert emulsions which provide the liquid medium in the compositions of the present invention should have a water content of about 5 to about 60 percent by weight. Within this percentage range a useful reduction in oil content can be realized without introducing too much water into the material while at the same time obtaining a satisfactory anticaking effect. The preferred percentage range is about 20 to about 50 percent by weight.

Various amines can be used as the active component of the composition. The amines can be used either in an unneutralized form or as salts. The term "amine" is thus used herein to mean either a free amine or an amine salt.

The amines are well known in the anticaking art and generally include aliphatic primary, secondary and tertiary amines having about 8 to about 40 carbon atoms, more particularly about 16 to about 18 carbon atoms. Examples of such amines are fish and rosin amines, more particularly tallow amine, hydrogenated tallow amine, stearyl amine, oleyl amine and the like. Ethoxylated amines such as bis-2-hydroxyethyl tallow amine are also useful. Salts of these amines with various acids such as hydrochloric acid and acetic acid are possible, although it is preferred to use salts with fatty acids having about 6 to about 30 carbon atoms.

Various types of mineral oils conventionally used in anticaking formulations can be used in the invert emulsions of the present invention. The oil may be paraffinic, naphthenic or aromatic in nature or a mixture of those. The oil may have a relatively high wax content and may be solid at room temperature.

The amine content of the composition is usually adjusted within the range of about 10 to about 20 percent by weight, about 15 to about 18 percent being the preferred range.

Additives may, if desired, be incorporated into the anticaking compositions to perform certain specific functions such as emulsifiers, stabilizers and fillers or parting agents. Useful emulsifiers are typically of the nonionic surfactant type. Here ethoxylated compounds are of general interest and as such ethoxylated alkylphenols, like nonylphenol ethoxylate (5 moles ethylene oxide), are very suitable.

Stabilizers are of interest to further improve storage stability of the compositions. Typical of useful stabilizers are hydrogenated castor oil and quaternary ammonium bentonites, like di(hydrogenated tallow)dimethyl ammonium bentonite. Particularly the latter compound, known in the trade as Bentone 34, appears in combination with nonylphenol ethoxylate to contribute to a much enhanced storage stability. Also, as compared to compositions based on oil-in-water emulsions, the present invert emulsion system exhibits freeze-thaw stability.

Fillers or parting agents may further be added and these are normally of the granular inorganic type, such as clay, calcium carbonate, silica talc and the like. However, such agents are usually added separately as a powder either before or after the amine/oil treatment. The anticaking composition may further include other components that are known to be useful in the anticaking art, provided the emulsion system is not impaired or broken. Such other components are paraffins, microcrystalline waxes, ethylene oxide-propylene oxide block polymers, fatty esters, fatty alcohols, and the like.

The anticaking compositions of the present invention are applicable to a wide range of caking materials, such as various fertilizer types. They are particularly useful in application to NPK (nitrogen-phosphorous-potassium) fertilizers and to materials or fertilizers consisting of or comprising calcium ammonium nitrate and ammonium nitrate. Generally caking materials may be considered to be any materials which in particulate form tend to agglomerate, i.e. to form agglomerates of the particles, upon standing under ambient conditions.

The anticaking composition is applied to the material in particulate form, as in the form of prills, granules, pellets and the like. Any suitable method of application may be employed and of the two common methods of application, namely rolling and spraying, the latter method is usually preferred. Viscosity is the main factor determining sprayability of the composition. Apart from the temperature at which the material is treated the viscosity largely depends on the water content of the invert emulsion and the type of amine and oil used. As a rule about 20 to about 50 percent water emulsions are best suited to meet practical demands.

The desired application level will generally be from about 0.01 to about 1.0 percent by weight in relation to the weight of the material and more particularly from about 0.02 to about 0.3 percent. The following nonlimiting description of experimental procedures, tests and observations illustrates practical embodiments of the invention.

A. Preparation of invert emulsion anticaking composition

The invert emulsion compositions referred to in the following examples were prepared by the following general procedure. A small amount of stabilizer was dispersed in the oil, whereafter the required amount of water was added followed by the emulsifier with stirring. Next the amine anticaking agent was added and the formulation stirred vigorously. Where necessary for better fluidity the above mixing procedure was performed at an elevated temperature. It was observed that a combined use of small amounts of the bentonite and nonylphenol ethoxylate gave emulsions of most satisfactory storage stability.

B. Determination of anticaking efficiency

1. Method of application 500 g. of material (fertilizer) was placed in a bottle, sealed and allowed to warm up to 40–50 C. in an oven. The material was then transferred to a 1000 ml bottle and the anticaking formulation, heated to 60° C., was weighed in to give the desired application level of 0.05 to 0.1 percent. The top was replaced and the sample rolled for five minutes to obtain an even distribution. In a number of cases 1 percent by weight of china clay was used on the material as parting agent. This was added after the anticaking formulation and again rolled for five minutes.

2. Caking test

The treated samples were subjected to the Whynes & Dee caking test (J. Sci. Food Agric. 1957, 8, 577) to determine the breaking stress as a measure of the tendency of the material to cake. In this test columns of fertilizer, approximately 2.5 cm in diameter by 10 cm high containing 100 g. material, are stored under a pressure of 41 kPa (6 psi) for seven days at ambient temperature. The pressure required to break the "caked" column is then determined.

EXAMPLE I

An invert emulsion composition was prepared on the basis of the following formulation by weight:

| | |
|---|---|
| hydrogenated tallow amine | 15% |
| water | 30% |
| oil | 50% |
| nonylphenol ethoxylate (5 moles ethylene oxide) | 3.5% |
| di(hydrogenated tallow)dimethyl ammonium bentonite | 1.5% |

The mixing was performed at 60° C. The relative amounts of water and oil provided for a 37.5% water-in-oil emulsion. The oil used here was a paraffinic oil, known in the trade as "Cerol 50", having a wax content of about 60 percent and a pour point of ca. 30° C. Various fertilizers were treated with the above composition and then subjected to the caking test. The same fertilizers were tested with a conventional composition of 20 percent hydrogenated tallow amine in the same oil (standard formulation), as well as without any anticaking treatment. The results obtained in the various tests are listed in Table I. The treatment of the calcium ammonium nitrate and the ammonium nitrate fertilizer samples did not include the addition of the parting agent.

TABLE 1

| FERTILIZER | TREATMENT | Breaking stress, kPa |
|---|---|---|
| NPK 25:5:5* | untreated | >220 |
| | 0.1% standard formulation | 26 |
| | 0.1% invert emulsion | 26 |
| NPK 15:8:20* | untreated | 200 |
| | 0.1% standard formulation | 24 |
| | 0.1% invert emulsion | 23 |
| NPK 20:15:14* | untreated | >220 |
| | 0.1% standard formulation | 21 |
| | 0.1% invert emulsion | 21 |
| NK 15:0:33* | untreated | >220 |
| | 0.1% standard formulation | 57 |
| | 0.1% invert emulsion | 66 |
| NP 24:8:0* | untreated | >220 |
| | 0.1% standard formulation | 66 |
| | 0.1% invert emulsion | 73 |
| Calcium ammonium nitrate | untreated | 120 |
| | 0.05% standard formulation | 32 |
| | 0.05% invert emulsion | 12 |
| Ammonium nitrate | untreated | 220 |
| | 0.05% standard formulation | 55 |
| | 0.05% invert emulsion | 55 |

*These figures refer to weight analysis expressed as $N:P_2O_5:K_2O$.

The figures of Table 1 show that the invert emulsions are applicable to various fertilizers with about equal and in some cases better effect than the conventional amine in oil formulation.

EXAMPLE II

According to the formulation in Example I invert emulsions were prepared, but replacing the hydrogenated tallow amine 15% by different amine anticaking agents. Anticaking tests were then carried out on an NPK fertilizer after treatment with 0.1 percent of the emulsions, including the parting agent, and the results are listed in Table 2.

TABLE 2

| FERTILIZER | ANTICAKING AGENT | Breaking stress, kPa |
|---|---|---|
| NPK 25:5:5 | untreated | >220 |
| | hydrogenated tallow amine | 26 |
| | tallow amine | 28 |
| | oleylamine | 26 |
| | hydrogenated tallow amine stearate | 27 |

It is concluded that conventional amines (unneutralized or as amine salts) can be used in the invert emulsion system. Only in the case of amine acetates at the same use level impractical, very viscous compositions are obtained. However, minor amounts of amine acetates can be incorporated into the formulation.

EXAMPLE III

The invert emulsion composition of Example I was further compared to amine formulations based purely on water and on an oil-in-water emulsion. The amine-in-water formulation had an equivalent amine concentration. The oil-in-water formulation was made up of 68 weight percent water, 20 weight percent oil and 12 weight percent hydrogenated tallow amine acetate. Application and caking tests were carried out as described before. Different fertilizers were tested at different application levels. In the case of the oil-in-water formulation the application level was adjusted to have the equivalent amount of amine applied. The results are summarized in Table 3. On the calcium ammonium nitrate and NPK 14:20:20 samples no parting agent was used.

TABLE 3

| FERTILIZER | TREATMENT | Breaking stress, kPa |
|---|---|---|
| NPK 25:5:5 | 0.1% amine in water | 32 |
| | 0.12% oil-in-water emulsion | 38 |
| | 0.1% invert emulsion | 26 |
| | 0.05% amine in water | 43 |
| | 0.06% oil-in-water emulsion | 52 |
| | 0.05% invert emulsion | 28 |
| Calcium ammonium nitrate | 0.05% in water | 30 |
| | 0.06% oil-in-water | 41 |
| | 0.05% invert emulsion | 27 |
| | 0.025% amine in water | 52 |
| | 0.03% oil-in-water emulsion | 53 |
| | 0.025% invert emulsion | 40 |
| NPK 14:20:20 | 0.05% amine in water | 57 |
| | 0.05% oil-in-water | 60 |
| | 0.05% invert emulsion | 50 |

From the figures in Table 3 it follows that the invert emulsions are generally more effective than the amine in water and oil-in-water emulsions formulations. On fertilizers which are relatively difficult to anti-cake, e.g. NPK 25:5:5, then the invert emulsions are very markedly better at lower application levels.

EXAMPLE IV

Invert emulsion formulations were prepared using oleylamine as the anti-caking agent in a naphthenic oil with different water contents. Each formulation contained 15 weight percent of the amine, the water content varied from 30 to 60 weight percent and minor amounts of nonylphenol ethoxylate and quaternized bentonite were added for stabilizing purposes. The oil used here was a mineral oil, known in the trade as "Batnap 19", containing about 17 percent aromatic carbon, 46 percent naphthenic carbon and 37 percent paraffinic carbon, and having a pour point of −39 C. The anticaking effect of each formulation was determined as before on two different fertilizers and the results are given in Table 4.

TABLE 4

| FERTILIZER | TREATMENT | Breaking stress, kPa |
|---|---|---|
| Calcium ammonium nitrate | untreated | 120 |
| | 0.05% invert emulsion, 30% water | 28 |
| | 0.05% invert emulsion, 40% water | 30 |
| | 0.05% invert emulsion, 50% water | 31 |
| | 0.05% invert emulsion, 60% water | 55 |
| Ammonium nitrate | untreated | 220 |
| | 0.05% invert emulsion, 30% water | 29 |
| | 0.05% invert emulsion, 40% water | 31 |
| | 0.05% invert emulsion, 50% water | 37 |
| | 0.05% invert emulsion, 60% water | 41 |

It is seen that the breaking stress of treated fertilizer increases as the water content of the emulsion increases. This increase may also be due in part to the increase in viscosity with the water content leading to a possibly less efficient spreading of the formulation over the fertilizer. Taking all factors into consideration it is believed that for practical purposes a water content of 60% of the emulsion, which corresponds roughly to 50% in the total formulation, is about the maximum permissable in the invert emulsions of the present invention.

What is claimed is:

1. An anticaking composition comprising a dispersion of an alkyl or cycloalkyl amine in a liquid medium comprising a water-in-oil emulsion containing mineral oil as the oil phase and from about 5 to about 60 percent, by weight, of water.

2. The anticaking composition of claim 1, wherein the emulsion comprises about 20 to about 50 percent by weight of water.

3. The composition of claim 1, wherein the dispersion further comprises an emulsifier of the nonionic surfactant type.

4. The composition of claim 3, wherein the emulsifier is a nonylphenol ethoxylate.

5. The composition of claim 4, wherein the dispersion further comprises a stabilizer.

6. The composition of claim 5, wherein the stabilizer is di(hydrogenated tallow)dimethyl ammonium bentonite.

7. A method of treating hygroscopic or water soluble material in particulate form comprising contacting said material with an anticaking composition which comprises a dispersion of an alkyl or cycloalkylamine in a liquid medium comprising a water-in-oil emulsion containing from about 5 to about 60 percent, by weight, of water, in an amount sufficient to reduce the tendency of said material to agglomerate.

8. The method of claim 7, wherein the emulsion comprises about 20 to about 50 percent by weight of water.

9. The method of claim 7, wherein the dispersion further comprises an emulsifier of the nonionic surfactant type.

10. The method of claim 9, wherein the emulsifier is a nonylphenol ethoxylate.

11. The method of claim 10, wherein the dispersion further comprises a stabilizer.

12. The method of claim 11, wherein the stabilizer is di(hydrogenated tallow)dimethyl ammonium bentonite.

* * * * *